MULTIPLE REEL MAGNETIC TAPE TRANSPORT

Filed Sept. 11, 1961 2 Sheets-Sheet 1

INVENTOR
FRANK M. CURTIN
BY
Gardner + Zimmerman
ATTORNEYS

MULTIPLE REEL MAGNETIC TAPE TRANSPORT

Filed Sept. 11, 1961 2 Sheets-Sheet 2

INVENTOR
FRANK M. CURTIN
BY
Gardner & Zimmerman
ATTORNEYS

United States Patent Office 3,143,311
Patented Aug. 4, 1964

3,143,311

MULTIPLE REEL MAGNETIC TAPE TRANSPORT

Frank M. Curtin, 15925 E. Whittier Blvd., Hayward, Calif.

Filed Sept. 11, 1961, Ser. No. 137,299
8 Claims. (Cl. 242—55.11)

This invention relates to magnetic tape transports in general, and is particularly directed to a transport which accommodates a plurality of reels for purposes of tape duplication, multiple tape recording and playback, multiple tape erasing and the like.

It is frequently desirable that one or more copies of tape be duplicated from a master recording tape. This is particularly so in modern language laboratories wherein many copies of a taped passage are required for distribution to the students. Heretofore it has been a rather elaborate and expensive operation to duplicate a master tape many times over. More specifically it has been usually necessary to employ a master playback unit with a slave duplicating record unit for each tape copy desired to be simultaneously produced from a master tape at the play back unit.

I have overcome the foregoing disadvantage by providing a multiple reel magnetic tape transport whereby one or more duplicate reels may be simultaneously produced from a master reel in a single unit. Although primarily for tape duplication service, it is to be understood that the multiple reel transport may as well be utilized as a multiple tape player, multiple tape recorder, multiple tape eraser, or in mixed combinations of the foregoing depending upon the specific arrangement of recording, playback, and erase heads employed in the transport.

It is therefore an object of the present invention to provide a tape transport capable of simultaneously feeding a plurality of magnetic tapes to a system of magnetic heads.

Another object of the invention is the provision of a multiple reel magnetic tape transport having a single supply spindle for carrying a plurality of supply reels, a single take-up spindle for carrying a corresponding plurality of take-up reels, and a single capstan for pulling all of the tapes synchronously adjacent a system of magnetic heads between the supply reels and take-up reels.

Still another object of the invention is the provision of a multiple reel tape transport of the class described having means for maintaining the reels mounted on the supply spindle and upon the take-up spindle in fixed spaced relation while permitting individual rotation of the reels.

It is yet another object of the invention to provide a multiple reel tape transport of the class described having dynamic stabilizer means for reducing irregularities in the speeds of the individual tapes such that all tapes are fed to the magnetic heads at a substantially constant speed.

It is a further object of the invention to provide a multiple reel tape transport of the class described which is relatively compact, simple, and economical in construction.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Figure 1:
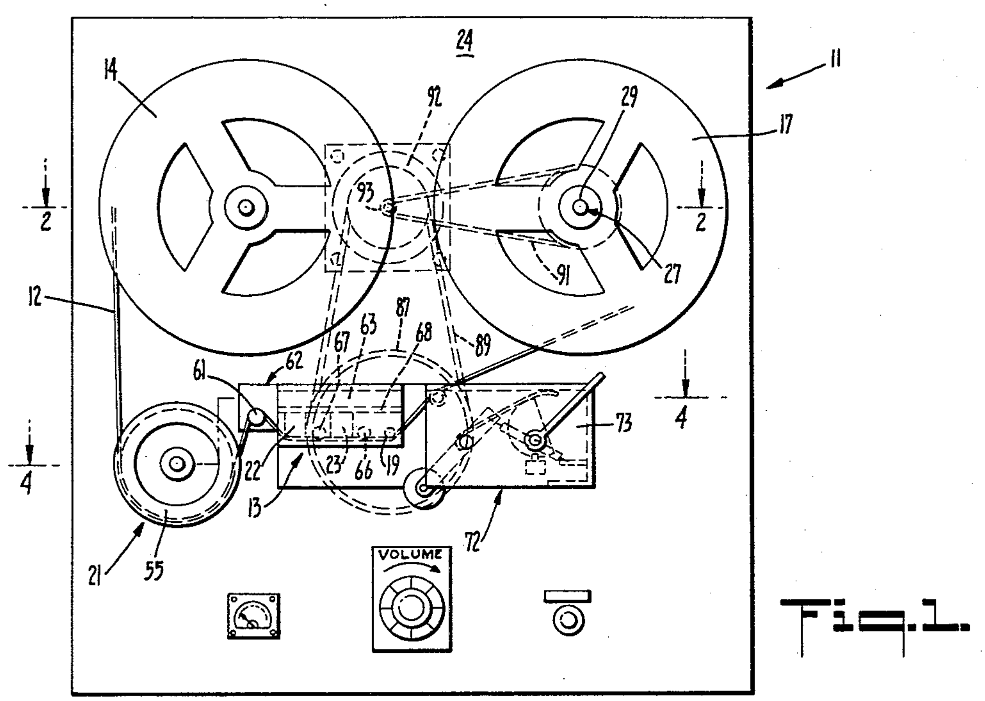
FIGURE 1 is a front elevation view of a multiple reel tape transport in accordance with the invention.
Figure 2:
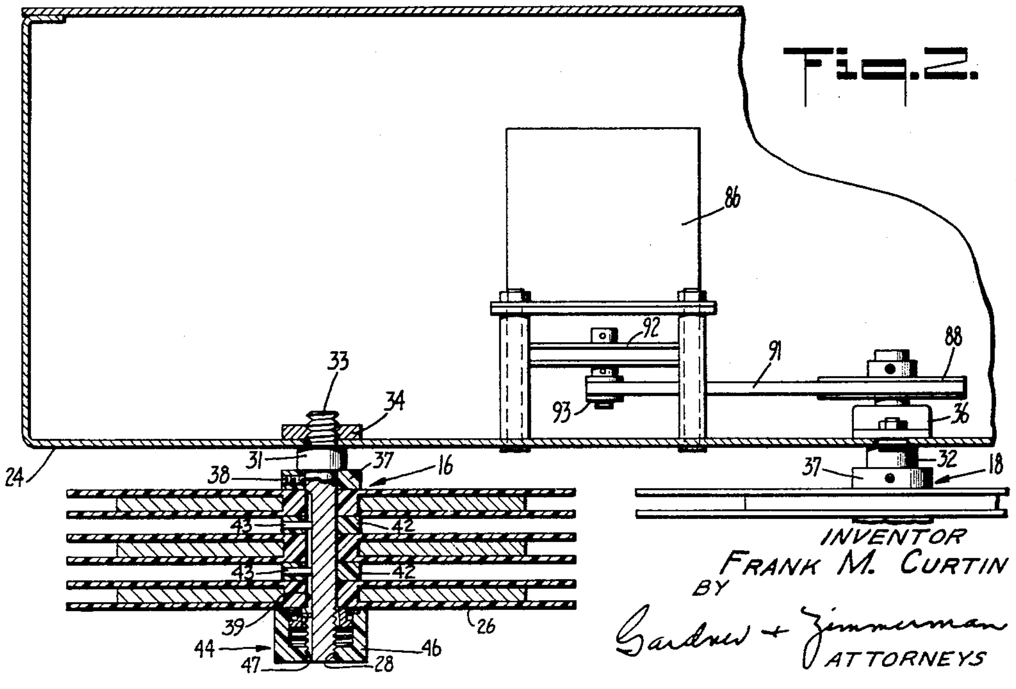
FIGURE 2 is a sectional view taken at line 2—2 of FIGURE 1, illustrating particularly the reel spacer and tensioning means employed with the pluralities of reels mounted on the same supply and the take-up spindles.
Figure 4:
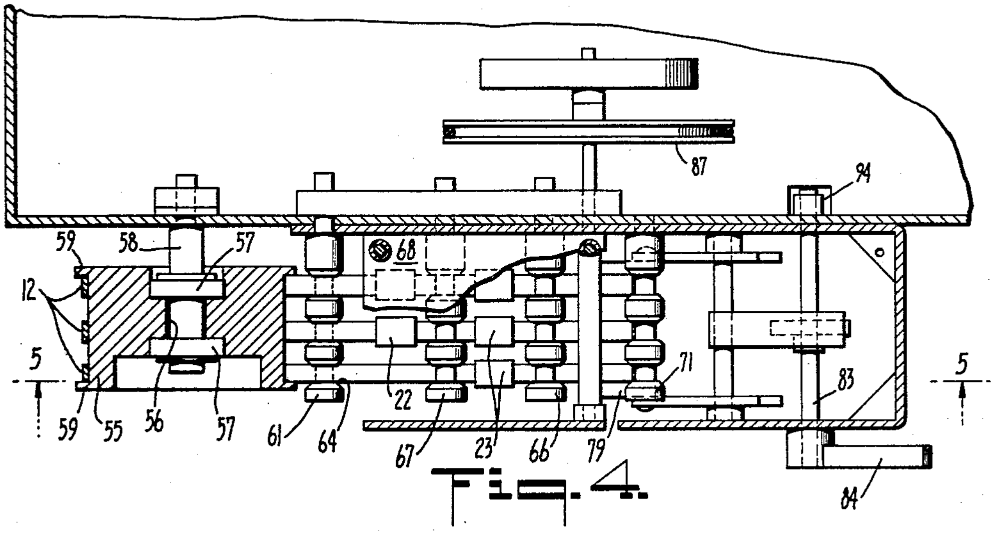
FIGURE 4 is a sectional view taken at line 4—4 of FIGURE 1, illustrating particularly details of the magnetic head arrangement and tape feed mechanism of the transport.

Referring now to the drawings there will be seen to be provided a magnetic tape transport 11 which is arranged to simultaneously feed a plurality of magnetic recording tapes 12 through a multiple magnetic head assembly 13. The tapes 12 are respectively wound upon a plurality of supply reels 14 all mounted upon a single supply spindle 16 and fed through the head assembly to a corresponding plurality of take-up reels 17 all mounted upon a single take-up spindle 18. Feeding of the tapes is facilitated by a single multiple tape capstan 19 which pulls all of the tapes in synchronism through the head assembly 13. It should be noted in this regard that inasmuch as the supply reels and take-up reels are mounted for individual rotation upon the supply and take-up spindles and yet are pulled by a single capstan, there would normally be a tendency for irregularities to occur in the speeds of the individual tapes. The foregoing difficulty is overcome, however, by a dynamic stabilizer 21 which reduces irregularities in tape speed from the individual supply reels 14. Accordingly, all of the tapes are synchronously pulled at a substantially constant speed through the head assembly 13.

The head assembly 13 may be provided as having any one of a number of different arrangements of heads depending upon the particular use to which the transport is to be put. For example, a plurality of erase heads 22, one for each tape, and a plurality of record and playback heads 23, one for each tape, may be included in the head assembly and utilized for many purposes depending upon their connection in the associated internal circuitry provided in the transport, which by virtue of its conventional nature is not illustrated nor described in great detail herein. In the particularly advantageous use of the transport as a multiple tape duplicator, one of the record and playback heads 23, e.g., the one corresponding to the outermost tape, of course, functions as a playback head and is not preceded by one of the erase heads 22. The other heads 23 then serve as record heads and are preferably preceded by erase heads 22. The playback head is then, for example, coupled to the input of an amplifier, the output of which is coupled to the record heads. In addition to the amplifier the circuitry of course includes bias oscillators coupled to the record heads, sources of erase current coupled to the erase heads, and other components of a conventional nature. With this arrangement and connection of the heads, recorded material appearing on the "master" tape corresponding to the playback head is applied through the amplifier to the record heads and is hence duplicated on the tapes corresponding thereto, any material originallly recorded on the latter tapes having been previously erased by the action of the erase heads 22. Thus a plurality of duplicate tapes may be simultaneously prepared from the master tape.

Considering now the mechanical structure of the multiple tape transport 11 in greater detail, it will be noted that same includes a housing 24 which serves to mount the various external components of the device and to house the internal circuitry and other components. The supply spindle 16 and take-up spindle 18 project normally from the front panel of housing 24 at longitudinally spaced positions. Both spindles are substantially identical in over-all make-up, but the supply spindle is secured to the panel in fixed relation while the take-up spindle is rotatable. More explicitly, the supply and take-up spindles respectively include shafts 26, 27 having their external ends threaded as indicated at 28, 29. Shafts 26, 27 are respectively provided with enlarged collar portions 31, 32 spaced outward from their internal ends and bearing against the front panel of the housing with the internal ends of the shafts extending through apertures in the front panel. The internal end of supply spindle shaft 26 is threaded as shown at 33 to receive a nut 34 and thus facilitate fixed attachment of the shaft to the panel. The internal end of take-up spindle shaft 27, on the other hand, if rotatably secured to the panel by means of a bearing 36 mounted upon the interior face thereof. Both of the shafts are provided with fixed annular spacer discs 37 of tetrafluoroethylene resin or equivalent low coefficient of friction material, which are secured to the shafts adjacent the collar portions 31, 32 as by means of set screws 38 extending radially through the discs. The shafts 26, 27 are further provided with keyways 39 extending longitudinally thereof from their external ends to points adjacent the discs 37.

The supply and take-up spindles 14, 18 also include pluralities of removable annular spacer discs 42 of similar material as the fixed discs 37. The discs 42 are concentrically mounted upon the supply and take-up spindle shafts 26, 27 in interposed relation between the pluralities of supply reels 14 and take-up reels 17 respectively rotatably mounted thereon. Rotation of the removable discs 42 is prevented by keys 43 which project radially inward from the disc bores into engagement with the keyways 39. To complete the supply and take-up spindles, clutch nuts 44 are respectively secured to the threaded external ends 28, 29 of the shafts and bear against the outermost supply and take-up reels 14, 17 mounted thereon. The pressure with which the nuts bear against the reels is readily adjustable to a value which facilitates individual free rotation of the reels at speeds which do not permit tape to be played out or taken up too fast. To this end the clutch nuts 44 each preferably comprise a cylindrical cup member 46 having a threaded aperture 47 in its closed end for engaging the threaded external ends 28, 29 of the shafts 26, 27. A center annular disc 48, of tetrafluoroethylene resin or the like, for concentric disposition about the shafts is slidably mounted within the cup member 46 and resiliently urged outwardly from its open end as by means of a helical loading spring 49. More specifically, the center disc 48 is formed with a reduced diameter projecting end portion 51 which extends beyond the open end of cup member 46 and an enlarged flange portion 52 which bears against spring 49 concentrically disposed in the cup member. The center disc 48 is retained within the cup member as by means of snap ring 53 mounted within an annular groove 54 adjacent the open end of the cup member and engaging the flange portion 52 on the opposite side thereof from the spring. It will thus be appreciated that as the clutch nut is tightened upon the threaded external end of one of the spindle shafts, the projecting end 51 of the center disc 48 bears against the outermost reel and is compressed against the spring 49. The latter thus forces the disc against the reel with a pressure dependent upon the extent to which the nut is tightened upon the shaft.

Considering now the dynamic stabilizer 21, it is to be noted that same preferably comprises a freely rotatable drum 55 mounted upon the front panel of housing 24 below the supply spindle 16 and around which the tapes 12 pass in transit from the supply reels 14 to the head assembly 13. The drum is of cylindrical configuration with an axial bore 56 within the opposite ends of which ball bearings 57 are secured, the bearings being in turn secured to a fixed shaft 58 projecting normally from the front panel of the housing. The drum is best formed with peripheral rims 59 at its opposite ends to retain the tapes thereon. The drum, moreover, is appropriately positioned relative to the supply spindle and head assembly such that the tapes contact substantially 180° of the drum circumference in passing therearound. To this end, the drum in addition to being positioned below the supply spindle, as noted previously, is positioned to the same side of the head assembly as the supply spindle. The head assembly includes an input tape guide post 61, details of which are subsequently described, which is positioned substantially 180° of drum circumference from the initial point at which the tapes contact the drum in transit from the supply spindle. The drum is thus rotated by the tapes bearing against its circumference. The drum tends to rotate at a constant speed, as possible variations in the tension of the multiple tapes do not ordinarily occur at the same instant. Moreover, the drum is sufficiently massive that the friction existing between the tapes and drum circumference reduces irregularities in tape speed from the supply reels whereby the tapes are fed at substantially constant speed to the head assembly.

The head assembly 13 preferably includes a support bracket 62 including an inverted channel portion 63 which serves to mount the heads 22, 23 and other components of the assembly. The bracket is mounted on the front panel of housing 24 beneath the supply and take-up spindles 14, 18 longitudinally intermediate same. The input guide post 61 projects outwardly from the bracket 62 adjacent the stabilizer drum 55 parallel to its rotational axis. Such guide post 61 is best formed as an elongated cylindrical rod having peripheral grooves 64 at spaced increments along its length corresponding to the spacing between the supply reels 14 and take-up reels 17 as determined by the thickness of the spacer discs 42. The lengths of the grooves 64 substantially correspond to the widths of the tapes 12 and the edges of the grooves are preferably smoothly rounded to reduce friction and abrasion on the tapes. The tapes pass over the input guide post through the grooves 64 thereof and into the channel portion 63.

Between the opposite sides of the channel portion 63 are mounted an output guide post 66 and intermediate guide post 67 both of identical construction as guide post 61 including spaced peripheral guide grooves for the individual tapes 12. The tapes pass from the top of guide post 61 under the posts 66, 67 through the guide grooves thereof. The guide posts thus retain the tapes in fixed spaced relation during transit through the head assembly and to guide the tapes adjacent the heads 22, 23 which are mounted in a corresponding relationship. More explicitly, a head support plate 68 is secured between the sides of the channel portion 63 of the bracket 62 in overlying relationship to the guide posts 66, 67. The erase heads 22 then depend from the plate in a transversely aligned array intermediate the guide posts 61, 66, the erase heads being respectively longitudinally aligned with the grooves of the posts. Similarly, the record and playback heads 23 depend from the plate 68 intermediate posts 66, 67 and are respectively aligned with the grooves thereof. Thus as the tapes are simultaneously pulled through the head assembly the guide posts appropriately position the tapes relative to the erase, and record and playback heads.

The capstan 19 is disposed adjacent the output guide post 67 on the take-up spindle side thereof. Preferably the capstan is formed as an elongated shaft which projects normally from the bracket 62 and extends therethrough as well as through the front panel of the housing. The inner end of the capstan shaft is preferably secured to a bearing mounted on the interior face of the panel so as to render the shaft rotatable. The tape passes under the capstan and then over a guide post 71, of like construction as the guide posts previously described herein, in transit to the take-up reels 17 mounted on take-up spindle 18.

Figure 5:
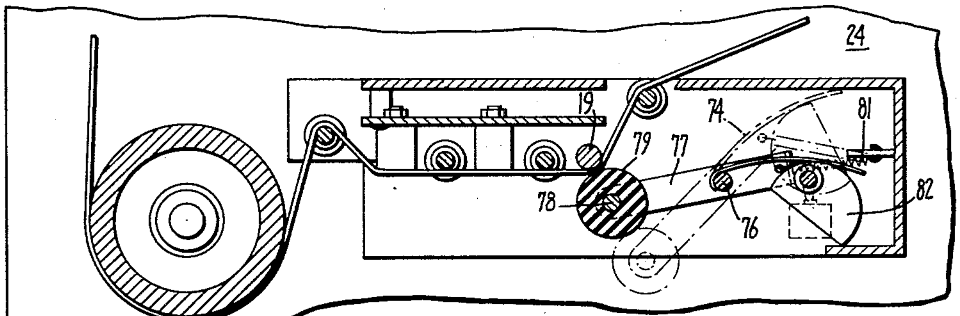
FIGURE 5 is a sectional view taken at line 5—5 of FIGURE 4 illustrating particularly further details of the tape feed mechanism in operable tape feeding position.
Figure 3:
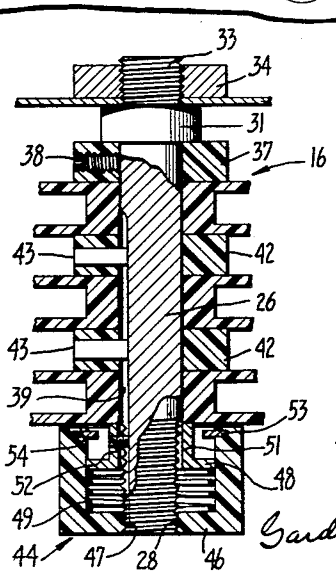
FIGURE 3 is a view on an enlarged scale of a portion of FIGURE 2.

In order that the tapes engage the capstan with tractive pressure, a pressure roller assembly 72 is provided to selectively urge the tapes against the capstan with sufficient pressure that rotation of the capstan effects pulling of the tapes. The assembly 72 includes an inverted channel mounting bracket 73 mounted upon the front panel of housing 24 adjacent the head assembly 13 on the output side thereof. A leaf spring 74 is disposed longitudinally centrally of the bracket and is end secured to a cross member 76 rotatably secured between the sides of the bracket. A pair of parallel spaced arms 77 project from the opposite ends of the cross member towards the capstan. A shaft 78 extends between the free ends of the arms 77 and a plurality of resilient pressure rollers 79 of rubber or the like are journalled upon the shaft in transversely spaced relation corresponding to the spacing between the tapes established by the guide posts. The distal ends of the arms 77 relative to the rollers 79 project beyond the cross member 76 and a pair of springs 81 are secured longitudinally between such ends of the arms and the web of the bracket. The springs 81 tend to normally urge the ends of the arms which carry the rollers upwardly towards the capstan to an operable position wherein the rollers engage the capstan. When the leaf spring 74 is urged upwardly from its normal position towards the web of the bracket, however, the ends of the arms carrying the rollers are moved downwardly to an inoperable position wherein the rollers are not out of engagement with the capstan. Movement of the arms and rollers between the foregoing operative and inoperative positions is selectively facilitated by means of a substantially semicircular cam 82 rigidly secured to a shaft 83 journalled between the sides of the bracket 73. The cam engages the leaf spring 74 and an operating handle 84 is secured to the external end of shaft 83 to provide for its ready rotation. When the handle is in the position depicted in FIGURE 1, the portion of the surface of cam 82 that engages the leaf spring is such as to urge the free end of the leaf spring upwardly whereby the rollers are inoperatively positioned. However, when the handle is rotated downwardly the cam is correspondingly rotated to present surface portions of lesser displacement from shaft 83 to the leaf spring as depicted in full line in FIGURE 5. The leaf spring is hence permitted to move downwardly under the influence of springs 81 operating on arms 77 with the free ends of such arms correspondingly rotating upwardly to operatively position the rollers 79 in engagement with the capstan. Thus the rollers may be selectively moved into operative position by manipulation of handle 84 to hold the tapes against the capstan with a tractive pressure.

To facilitate driving of the capstan 19 and take-up spindle 18 a motor 86 is mounted within housing 24 and coupled in rotary driving relationship to the latter components. To this end, pulleys 87, 88 are preferably secured to the internal ends of the capstan and take-up spindle shaft 27 and coupled by means of belts 89, 91 to pulleys 92, 93 secured to the drive shaft of the motor. In addition, the energization circuit of motor 86 preferably includes an on-off switch 94 mounted on the interior face of the front panel of housing 24. Such switch is operatively coupled to the internal end of shaft 83 in such a manner that the off position corresponds to the operative position thereof. Thus, when the handle is moved to operative position not only are the pressure rollers moved into engagement with the capstan, but the motor is energized to drive the capstan and take-up spindle.

In the operation of the multiple tape transport physically described hereinbefore, a plurality of supply reels 14 of tapes 12 are placed on the supply spindle shaft 26 with a plurality of the spacer discs 42 interposed therebetween. A clutch nut 44 is then secured to the end of the shaft 26 and tightened to exert an appropriate pressure against the outermost one of the supply reels 14. The tapes are led around the stabilizer drum 55 and through the grooves of the guide posts 61, 66, 67 in the head assembly 13. The tapes are then led under the capstan 19 and through the grooves of guide post 71, to be then secured to the take-up reels 17. These reels are placed on the take-up spindle shaft 27 with spacer discs 42 interposed therebetween and a clutch nut 44 is appropriately tightened upon the external end of the shaft. With the internal circuitry of the transport suitably energized the operating handle 84 may now be turned to its operative position, the pressure rollers 79 in turn urging the tapes into tractive engagement with the capstan and the motor 86 being energized to drive the capstan and take-up spindle. The multiple tapes are thus synchronously pulled through the head assembly by the capstan and wound upon the take-up reels. The stabilizer drum 55 reduces irregularities in the speeds of the tapes such that they pass through the head assembly adjacent the heads 22, 23 at substantially constant speed. Depending upon the connection of the heads, tape duplication or other multiple tape operations are thus accomplished with the single tape transport 11.

What is claimed is:

1. A tape transport comprising a mounting panel, a supply spindle and a take-up spindle mounted in spaced relation upon said panel, a plurality of supply reels having tapes wound thereon carried upon said supply spindle, spacer means on said supply spindle interposed between said supply reels to retain same in individually rotatable spaced relation, clutch nut means secured to the outer end of said supply spindle for exerting an adjustable amount of pressure against an outermost one of said supply reels, a corresponding plurality of take-up reels carried upon said take-up spindle with the leading ends of said tapes correspondingly secured to said take-up reels, spacer means on said take-up spindle interposed between said take-up reels to retain same in individually rotatable spaced relation, clutch nut means secured to the outer end of said take-up spindle for exerting an adjustable amount of pressure against an outermost one of said take-up reels, a multiple magnetic head assembly mounted upon said panel intermediate said supply and take-up spindles, said assembly having a plurality of heads corresponding to said tapes, means guiding said tapes from said supply reels through said head assembly adjacent corresponding ones of said heads and to said take-up reels, and capstan means synchronously pulling said tapes between said supply reels and take-up reels.

2. A tape transport according to claim 1, further defined by dynamic stabilizer means including a freely rotatable drum mounted upon said panel with said tapes being guided around the circumference of said drum in transit from said supply reels to said head assembly.

3. A tape transport comprising a mounting panel, a supply spindle shaft secured to said panel and projecting therefrom, spacer means on said supply spindle shaft for retaining a plurality of tape supply reels thereon in individually rotatable spaced relationship, clutch nut means secured to the outer end of said supply spindle shaft for exerting an adjustable amount of pressure against an outermost one of said supply reels, a take-up spindle shaft rotatably secured to said panel and projecting therefrom at a position displaced from said supply spindle shaft, spacer means on said take-up spindle shaft for retaining a plurality of tape take-up reels thereon in individually rotatable spaced relationship, clutch nut means secured to the outer end of said supply spindle shaft for exerting an adjustable amount of pressure against an outermost one of said take-up reels, a multiple magnetic head assembly mounted upon said panel intermediate said supply and take-up spindle shafts, said assembly having a plurality of heads correspondingly transversely positioned relative to supply and take-up reels retained in spaced relation upon said supply and take-up spindle shafts by said spacer means, a capstan rotatably secured to said panel and projecting therefrom adjacent said head assembly on the side thereof towards said take-up spindle shaft, tape guide means mounted on said panel for guiding tapes from supply reels mounted on said supply spindle shaft through said head assembly adjacent to corresponding heads thereof and over said capstan to take-up reels mounted on said take-up spindle shaft, pressure roller means mounted upon said panel and selectively engageable with said capstan to urge said tapes thereagainst, and rotary drive means coupled to said capstan and take-up spindle shaft to rotate same.

4. A tape transport according to claim 3, further defined by a freely rotatable drum mounted upon said panel, and means for guiding tapes from supply reels on said supply spindle shaft around substantially 180° of circumference of said drum in transit to said head assembly.

5. A tape transport according to claim 3, further defined by said supply and take-up spindle shafts having keyways extending longitudinally therealong from their external ends; said spacer means comprising a fixed annular disc of tetrafluoroethylene resin fixed to each said shafts adjacent said panel and a plurality of removable annular spacer discs of tetrafluoroethylene resin concentrically disposed upon each said shafts longitudinally thereof and having keys engaging said keyways; and said clutch nut means comprising a cup shaped member threadably secured to the external end of each said shafts with the open end of said member innermost, an annular center disc of tetrafluoroethylene resin concentrically disposed within said cup-shaped member and concentrically disposed about the shaft, said center disc having a portion projecting beyond the open end of said cup-shaped member, a spring within said cup-shaped member urging said center disc in the direction of said open end, and means retaining said center disc within said cup-shaped member.

6. A tape transport according to claim 3, further defined by said pressure roller means comprising a mounting bracket secured to said panel adjacent said capstan, a pair of parallel arms pivotally secured to said bracket, a leaf spring secured to said arms and pivotal therewith, a shaft secured between said arms at one end thereof, a plurality of pressure rollers journalled upon said shaft and engageable with said capstan, an operating shaft rotatably mounted upon said bracket and carrying a cam in engagement with said leaf spring to urge same between upper and lower limits upon rotation of the operating shaft, and spring means secured to the second ends of said arms to normally resiliently urge the first ends thereof towards said capstan to a position wherein said rollers engage said capstan, said arms being urged to a position wherein said rollers are out of engagement with said capstan in response to urging of said leaf spring to said upper limit.

7. A multiple tape spindle assembly comprising a shaft having a threaded end and a keyway extending longitudinally therealong from said threaded end, a fixed annular spacer disc of tetrafluoroethylene resin retentively concentrically secured to said shaft adjacent the end of said keyway, a plurality of removable annular spacer discs of tetrafluoroethylene resin concentrically disposed about said shaft longitudinally therealong and having keys engaging said keyway, a cup-shaped member having a threaded aperture in its closed end engaging the threaded end of said shaft with the open end of the member facing inwardly thereof, a center annular disc of tetrafluoroethylene resin concentrically disposed within said member and concentrically about said shaft, said center disc having a portion projecting beyond the open end of said member, a spring within said member urging said center disc towards said open end, and means retaining said center disc within said member.

8. A tape transport comprising spaced apart supply and take-up spindles projecting from a mounting panel, a multiple magnetic head assembly mounted upon said panel, a plurality of supply reels having tapes wound thereon carried upon said supply spindle, spacer means on said supply spindle interposed between said supply reels to retain same in individually rotatable spaced relation, clutch nut means secured to the outer end of said supply spindle for exerting an adjustable amount of pressure against an outermost one of said supply reels, a corresponding plurality of take-up reels carried upon said take-up spindle receiving said tapes from respective ones of said supply reels, said tapes passing through said head assembly in transit to said take-up reels, spacer means on said take-up spindle interposed between said take-up reels to retain same in individually rotatable spaced relation, clutch nut means secured to the outer end of said take-up spindle for exerting an adjustable amount of pressure against an outermost one of said take-up reels, and means for synchronously pulling said tapes between said supply reels and take-up reels.

References Cited in the file of this patent

UNITED STATES PATENTS

| | | |
|---|---|---|
| 2,503,925 | Tinkham | Apr. 11, 1950 |
| 2,560,234 | Masterson | July 10, 1951 |